Patented June 16, 1942

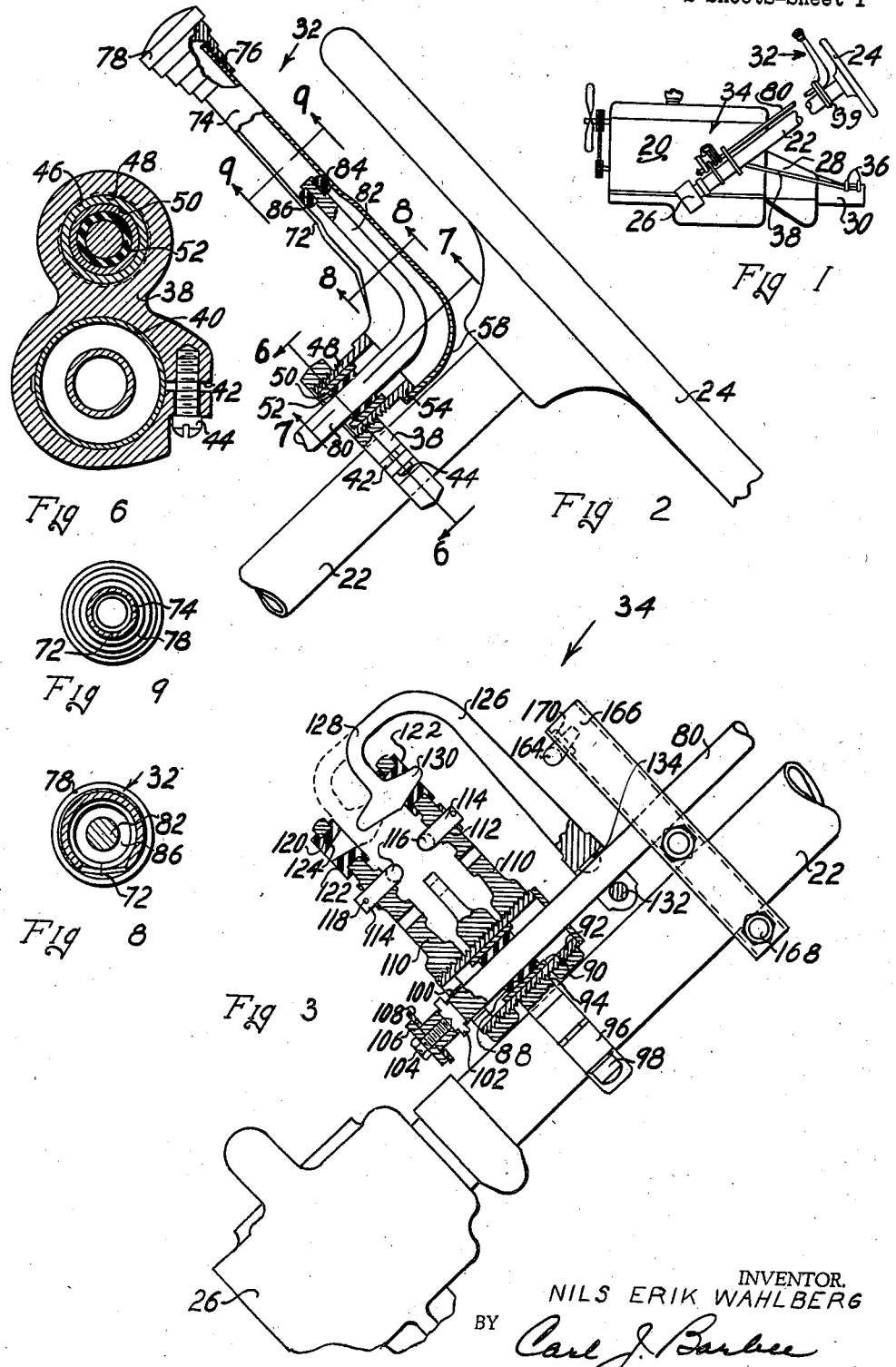

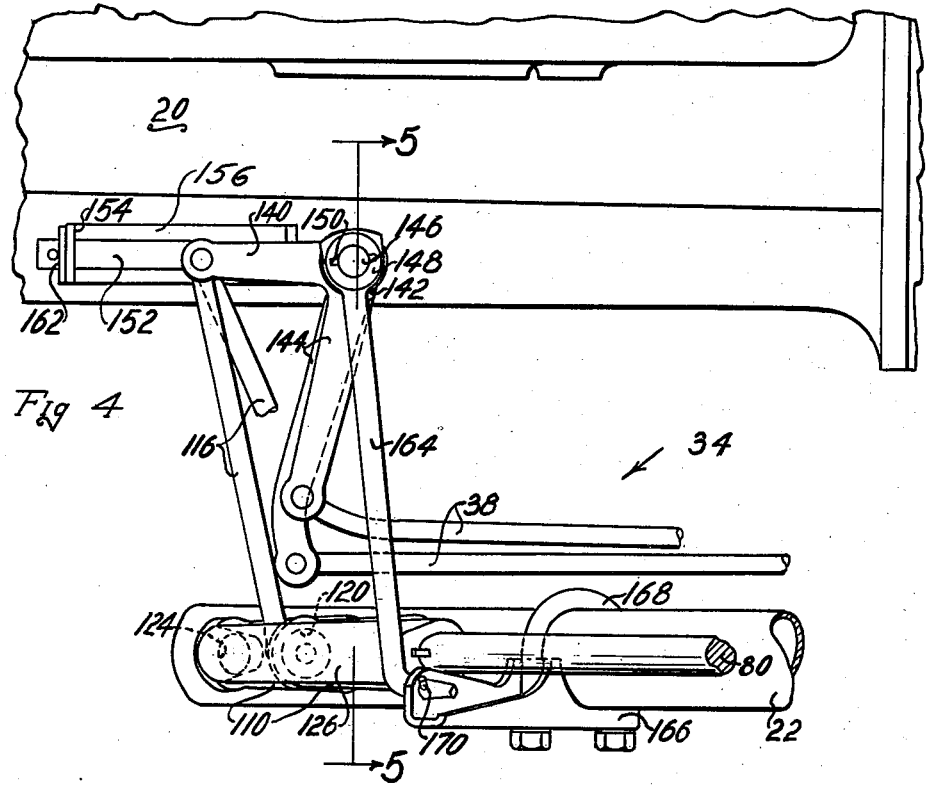
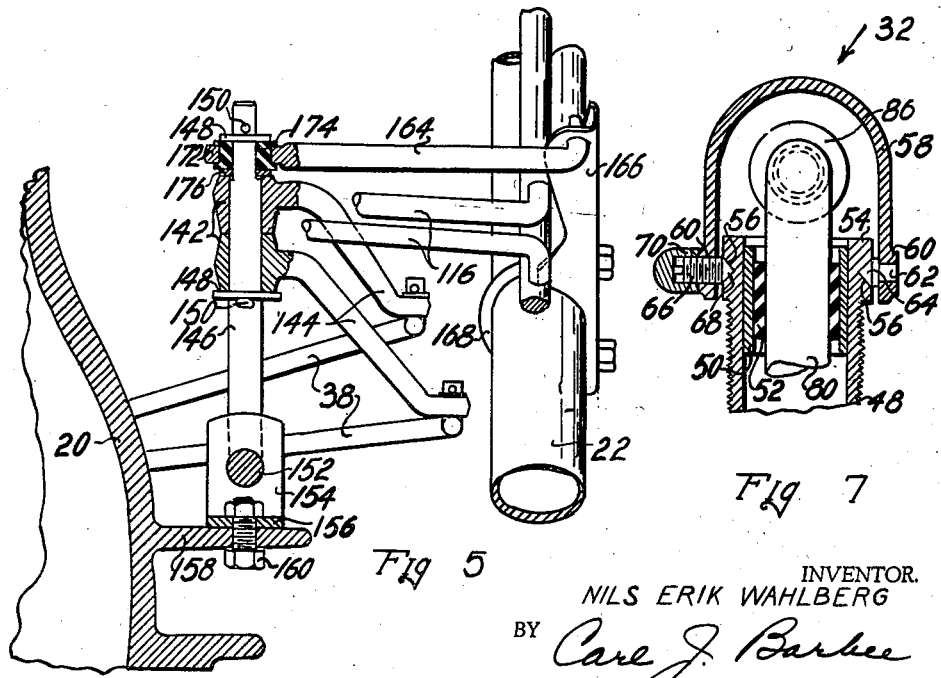

2,286,773

UNITED STATES PATENT OFFICE 2,286,773

REMOTE GEAR SHIFTING MECHANISM

Nils Erik Wahlberg, Kenosha, Wis., assignor to Nash-Kelvinator Corporation, Kenosha, Wis., a corporation of Maryland Application July 10, 1940, Serial No. 344,689

18 Claims. (Cl. 74—484)

This invention relates to remote gear shifting mechanism and more particularly to mechanism by means of which an automotive transmission may be shifted from a handle located on the steering column of an automobile.

It is an object of this invention to provide novel linkage for shifting gears, which linkage is made up of inexpensive parts.

It is another object of this invention to provide gear shifting mechanism arranged to compensate for movement of the transmission relative to the frame and body of an automobile.

It is another object of this invention to provide gear shifting mechanism which will not transmit vibration to the gear shift handle.

Other objects and advantages of this invention will be apparent from a consideration of the following description and claims and the attached drawings of which there are two sheets and in which—

Figure 1 represents a side elevation of an automotive engine, transmission and steering column with gear shifting mechanism associated therewith;

Figure 2 represents a side elevation partially in section of a steering wheel with a gear shift handle associated therewith;

Figure 3 represents a side elevation partially in section of the lower end of a steering column with gear shifting linkage attached thereto;

Figure 4 represents a plan view of the lower end of a steering column and engine with gear shifting linkage attached thereto, some parts of the shifting linkage being omitted for the purpose of clarity of the drawings;

Figure 5 represents a vertical sectional view taken along a plane indicated by the line 5—5 in Figure 4 and looking in the direction of the arrows, some of the parts shown in Figure 4 being omitted in Figure 5;

Figure 6 represents a sectinal view taken along a plane indicated by the line 6—6 in Figure 2 and looking in the direction of the arrows;

Figure 7 represents a sectional view taken along a plane indicated by the line 7—7 in Figure 2 and looking in the direction of the arrows;

Figure 8 represents a sectional view taken along a plane indicated by the line 8—8 in Figure 2 and looking in the direction of the arrows; and, Figure 9 represents a sectional view taken along a plane indicated by the line 9—9 in Figure 2 and looking in the direction of the arrows.

Illustrated in Figure 1 is an internal combustion engine 20 and a steering column 22 shown in their relative positions as they are mounted in an automobile. The steering column 22 is provided with the usual steering wheel 24 and steering gear 26. The engine 20 is provided with the usual clutch housing 28 and transmission 30.

Mounted on the top of the steering column 22 just under the wheel 24 is a gear shift handle generally indicated at 32 which is connected to cross-over mechanism generally indicated at 34 at the bottom of the steering column 22. The transmission 30 may be of any familiar design arranged to be shifted by movement of two levers 36. Levers 36 are connected to shift rods 38 which extend forwardly and are connected to the cross-over mechanism 34 in a manner which will be more particularly described later. The construction of the gear shift handle is most clearly shown in Figures 2, 6, 7, 8 and 9. The construction of the cross-over mechanism 34 is most clearly illustrated in Figure 3, and the connected linkage between the cross-over 34 and the transmission 30 is most clearly illustrated in Figures 4 and 5.

Considering first the gear shift handle 32, the steering column 22 carries a bracket 39 which is apertured at 40 and slotted at 42 so as to be easily slipped over the steering column 22 and clamped thereto by means of a screw 44 passed through one side of the bracket 38 and threaded into the bracket on the opposite side of the slot 42. Bracket 38 is provided with an internally threaded aperture 46 in which is mounted the threaded bushing 48 which in turn supports a metal sleeve 50 and an annular rubber gasket 52. The upper end of the bushing 48 is formed into a thickened flange 54 (see Figures 2 and 7) which is provided with diametrically opposed conical notches 56.

Gear shift handle 32 is formed as a stamping having a generally U-shaped cross section at its end near the steering column 22, the end being turned over as indicated at 58 (see Figure 2) so as to have a generally U-shaped end extending around three sides of the bushing 48. The legs of the U-shaped end of the handle 32 are extruded and pierced as at 60. One of the holes 60 receives a shouldered pin 62 having a cone shaped point 64. The opposite hole 60 is tapped to receive a threaded pin 66 which is provided with a cone-shaped point 68. An internally threaded cap nut 70 is screwed over the end of the pin 66 to act as a lock nut. The conical points 64 and 68 are arranged to fit within conical notches 56 in the bushing 48 and form a pivot for the shift handle 32.

Toward the outer end of the handle 32 the sides of the stamping are drawn closer together until they are joined as at 72 to form a cylindrical cross section. The diameter of the cylindrical portion of the handle is constant for a short distance and then tapers to a smaller diameter at the outer end of the handle. The edges thus joined together are welded so as to form a continuous tube 74 which is threaded at its end as at 76. A decorative knob 78 of moulded plastic is secured on the threaded end 76.

Journaled in the rubber bushing 52 is a shift column 80 which extends downwardly along the steering column 22 through the bushing 48. The shift column 80 is bent at right angles and reduced in diameter as at 82 (see Figure 2). The end 82 is provided with an annular groove 84 within which is positioned a rubber grommet 86. The grommet 86 is of such outside diameter as to fit within the portion 74 of the shift handle 32 which is of constant diameter. The handle 32 is easily installed on the shift column 80 by pressing the tubular portion 74 over the grommet 86 and then tipping the inner end 58 of the handle downwardly over the upper end of the shift column 80 and the bushing 48. The conical pins 64 and 68 may then be installed to pivotally mount the handle 32 on the bushing 48.

Rotation of the handle 32 will turn the bushing 48 in the bracket 38 and will also rotate the shift column 80 about its axis due to the position of the bent over portion 82 in the handle 32. When the end of the handle is raised or lowered, it will pivot around the conical pins 64 and 68, and the tubular section 74 will raise and lower grommet 86 and the end of the shift column 80 to reciprocate the shift column along its axis. The rubber grommet 86 is sufficiently flexible so as to compensate for the new relative alignment between the bent over end 82 of the shift column 80 and the tubular section 74 of the handle 32. The grommet 86 will also slide in the tubular portion 74 so that the handle 32 may be raised or lowered without bending the shift column 80.

The lower end of the shift column 80 is supported in a rubber bushing 88 (see Figure 3) which is in turn supported in a metal sleeve 90 in an externally threaded tubular bushing 92. The tubular bushing 92 is supported in a threaded aperture 94 formed in a bracket 96 which is clamped around the steering column 22 by a screw 98 in much the same manner as the bracket 39 is clamped to the upper end of the steering column 22. The lower end of the sleeve 92 is closed except for a notched aperture 100 through which the lower end of the shift column extends. A key 102 is secured in a slot through the shift column 80 by means of a screw 104 threaded into the end of the shift column. Screw 104 also secures a limiting plate 106 to the end of the shift column, which plate 106 will engage the end of the bushing 92 to limit the upward movement of the shift column 80. A rubber washer 108 is provided against the plate 106 to cushion the plate 106 as it strikes the bushing 92.

Positioned above and below bracket 96 and threaded on the ends of the bushing 92 are a pair of arms 110. Each arm 110 is apertured as at 112 so as to receive the bent over end 114 of one of a pair of cross rods 116. Cross rods 116 are secured to the arms 110 by means of pins 118. The ends of the arms 110 are provided with larger apertures 120 within which are positioned rubber grommets 122 having an outer annular groove which fits around the edges of the apertures 120. Rubber grommets 122 are provided with conical shaped apertures 124 opening towards each other between arms 110.

Secured to the shift column 80 above the arms 110 is a shift arm 126 having a U-shaped end 128 which extends between the arms 110 and is provided with cone-shaped points 130 which are arranged to fit into the conical apertures 124 in the rubber grommets 122. The arm 126 has a split lower end and is clamped around the shift column 80 by means of a screw 132. A key 134 is also provided between the arm 126 and the shift column 80 so that the arm 126 will rotate and move with the column.

As the column 80 is reciprocated along its axis, the conical points 130 of the arm 126 may be engaged with the rubber grommet 122 in either the upper or lower arm 110. As the column is rotated, the points 130 will move the engaged arm 110 about the axis of the column 80 to move the cross rod 116 attached to the arm. It will be noted that the notch 100 at the lower end of bushing 92 is so positioned with respect to the key 102 that the column 80 may be moved axially into and out of engagement with the arms 110 only when the arms 110 and 126 are in a generally vertical position. It is contemplated that this vertical position will correspond to a neutral adjustment of the transmission. Therefore, before one of the levers 110 may be engaged and shifted by the arm 126, the other lever 110 must be returned to its neutral position, thus preventing two sets of gears being meshed at the same time. It is also to be noted that the key 102 must clear above or below notch 100 before column 80 can be rotated. Notch 100 is long enough so that to clear it, column 80 must be moved far enough to also clear the points 130 of arm 126 from one or the other of arms 110. This prevents both arms 110 from being moved at once.

Each of the cross rods 116 extend to the forward arm 140 on one of a pair of cranks 142. The other arms 144 of each of the pair of cranks 142 is connected to one of the shift rods 38 which extend backwardly to operate the shift levers 36 of the transmission. Thus the upper of the pair of arms 110 on the column 80 with its associated cross rod 116 is connected to the arm 140 of the upper crank 142, and the arm 144 of the upper crank 142 is connected to the upper shift rod 38 so that by raising shift handle 32 and engaging the point 130 on the arm 126 with the upper of the pair of arms 110 and rotating the shift handle 32 downwardly, the arm 110 and upper cross rod 116 will be moved toward the engine 20 imparting a clockwise rotation to the upper crank 142 as viewed in Figure 4 and drawing the upper shift rod 38 forwardly. A reverse rotation of the shift handle 32 will of course impart a rearward motion to the upper shift rod 38, and by lowering the end of the shift handle 32, corresponding motions may be transmitted to the lower shift rod 38.

The cranks 142 are supported upon a mast 146 by means of washers 148 and pins 150. The mast 146 is provided with a right angle bend at its lower end so as to have a horizontal portion 152 which is received in apertures in the legs 154 of a U-shaped clip 156. Clip 156 is secured to a flange 158 on the engine 20 by means of bolts 160. The horizontal portion 152 of the mast 146 is retained in the clip 156 by a washer and cotter pin as at 162.

The top of the mast has attached thereto a brace rod 164 which extends to a clip 166 secured to the steering column 22 by means of the U-bolt 168. The brace rod 164 is bent over and passed through a flange of the clip 166 where it is secured by a pin 170. The inner end of the brace rod 164 is formed into an eye 172 within which is positioned the flanged rubber grommet 174 which forms a flexible journal around the mast 146. The brace rod 164 is secured on the mast by the washer 148 and pin 150, and a washer 176 is provided between the eye 172 and the upper crank 142.

The horizontal portion of the mast 146 is free to rotate within the legs 154 of the U-shaped clip 146, and the rubber grommet 174 at the top of the mast permits the mast and brace rod 164 to assume various relative alignments. Since the motor 20 may move as is the case in present day flexibly mounted motors, this flexible support of the mast is provided so that as little motion as possible is imparted to the cranks 142 due to movement of the engine 20. It will be noted that the cross brace 164 is connected to the fixed clip 166 so that the upper end of the mast 146 will remain fixed relative to the frame and body while any motion of the mast occurs at the lower end of the mast where the horizontal portion 152 pivots in the clip 156. The cranks 142, being positioned near the upper end of the mast 146, receive little motion since they are near the center of the arc about which the mast is moved. Thus movement of the engine 20 will have little tendency to move the position of the shift rods 38, and the transmission cannot be accidentally shifted.

The shift handle 32 is of a very light construction and has very little tendency to turn the shift column 80 due to its weight hanging eccentrically on the axis of the shift column. The handle 32 is also completely insulated from vibrations, which might emanate from the engine, by the rubber grommets 86, 88, and 52. Thus the shifting linkage is positive in action and not subject to rocking of the motor, while at the same time being free from vibration in the operating handle. The connecting linkage needs very little expensive machining and may be made of inexpensive parts.

While I have described my invention in some detail, I intend this description as an example only and not limiting on my invention to which I make the following claims:

1. In combination with an automobile having a transmission arranged to be shifted by movement of a pair of levers, a shift column supported for rotational and axial movement, a pair of arms supported for rotation co-axially with said shift column, a shift arm secured to said shift column and selectively engageable with either of said pair of arms by axial movement of said shift column, a cross link connected to each of said pair of arms, a pair of cranks, said cross links being connected to said cranks, shift rods connected between said cranks and the levers on said transmission, and a mast for supporting said cranks, said mast having one end fixed relative to said transmission and being arranged to oscillate about said one end relative to said transmission.

2. In combination with an automobile having a transmission arranged to be shifted by movement of a pair of levers, a shift column supported for rotational and axial movement, a pair of arms supported for rotation co-axially with said shift column, a shift arm secured to said shift column and selectively engageable with either of said pair of arms by axial movement of said shift column, a cross link connected to each of said pair of arms, a pair of cranks, said cross links being connected to said cranks, shift rods connected between said cranks and the levers on said transmission, and a mast for supporting said cranks, said mast having one end fixed relative to said transmission and being arranged to rotate relatively thereto, said cranks being supported on said mast near the end thereof having the most movement relative to said transmission.

3. In combination with an automobile having a body and a motor mounted to rotate relative to said body, a transmission secured to said motor and arranged to be shifted by movement of a lever, a shift column supported for axial and rotative movement relative to said body, an arm supported for rotation with respect to said shift column and co-axially thereof, a shift arm secured to said shift column and engageable with said first arm, a mast pivotally supported on said motor and having its free end braced with respect to said body, a crank pivoted on said mast near the braced end thereof, a cross link pivotally connected between said first arm and said crank, and a shift rod pivotally connected between said crank and the lever on said transmission.

4. In combination with an automobile having a body and a motor mounted to rotate relative to said body, a transmission secured to said motor and arranged to be shifted by movement of a lever, a shift column supported for axial and rotative movement relative to said body, an arm supported for rotation with respect to said shift column and co-axially thereof, a shift arm secured to said shift column and engageable with said first arm, a mast pivotally supported on said motor and having its free end braced with respect to said body, a crank pivoted on said mast near the braced end thereof, a cross link pivotally connected between an arm of said crank and said shift arm, a shift rod pivotally connected between a second arm of said crank and the lever on said transmission, and a shift handle mounted on the upper end of said shift column, said shift handle having its center of mass near the axis of said shift column.

5. In combination with an automobile having a transmission arranged to be shifted by movement of a pair of levers and a steering column, a shift column, a pair of journals for said shift column secured to said steering column, a pair of arms pivotally supported on a portion of the lower of said journals, a shift arm secured to said shift column and engageable with either arm of said pair of arms, a hollow shift handle pivoted on the upper of said journals, a bent over portion formed on the upper end of said shift column and positioned within said hollow shift handle, a flexible gasket carried on the end of said bent over portion and engaging the inner surface of said shift handle, and linkage connecting said pair of arms with levers on said transmission.

6. In combination with an automobile having a steering column, a transmission arranged to be shifted by movement of a pair of levers, a pair of brackets secured to said steering column, externally threaded tubular members supported by said brackets, bushings positioned within said tubular members, a pair of arms rotatively threaded on the lower of said tubular members, a hollow shift handle pivotally supported on the upper of said tubular members, a shift column supported in said journals and having a bent over portion positioned in said hollow shift handle, a shift arm secured to said shift column and having a hooked portion engageable with either arm of said pair of arms, a flexible gasket carried on the bent over portion of said shift column and engaging the inside surface of said shift handle at a point away from the support of said handle, and linkage connecting said pair of arms to the levers on said transmission.

7. In combination with an automobile having a steering column, a transmission arranged to be shifted by movement of a pair of levers, a pair of brackets secured to said steering column, externally threaded tubular members supported by said brackets, bushings positioned within said tubular members, a pair of arms rotatively threaded on the lower of said tubular members, a hollow shift handle pivotally supported on the upper of said tubular members, a shift column supported in said journals and having a bent over portion positioned in said hollow shift handle, a shift arm secured to said shift column and having a hooked portion engageable with either arm of said pair of arms, a flexible gasket carried on the bent over portion of said shift column and engaging the inside surface of said shift handle at a point away from the support of said handle, linkage connecting said pair of arms to the levers on said transmission, and a wall formed on one of said tubular members defining a notched aperture through which said shift column extends, a key projecting from the side of said shift column adjacent to said wall whereby said shift column is movable axially only when said key registers with said notch.

8. In combination with an automobile having a steering column, a bracket clamped to said steering column, a shift column supported by said bracket and having a bent over end portion, a shift handle pivotally supported by said bracket and around the bent over portion of said shift column, said shift handle having a generally channel-shaped cross section near its support, the flanges of said channel-shaped cross section being brought together toward the outer end of said shift handle to form a tubular cross section decreasing in diameter toward the end of said tubular section, and a deformable gasket carried on the end of the bent over portion of said shift column and engaging the inside of the tubular portion of said shift handle.

9. In combination with an automobile having a steering column, a bracket clamped to said steering column, a shift column supported by said bracket and having a bent over end portion, a shift handle pivotally supported by said bracket and around the bent over portion of said shift column, said shift handle having a generally channel-shaped cross section near its support, the flanges of said channel-shaped cross section being brought together toward the outer end of said shift handle to form a tubular cross section decreasing in diameter toward the end of said tubular section, and a deformable gasket carried on the end of the bent over portion of said shift column and engaging the inside of the tubular portion of said shift handle, the tubular portion of said shift handle being of constant diameter where said tubular portion is engageable with said deformable washer.

10. In combination with an automobile having a body, a motor arranged to rotate relative to said body, a transmission secured to said motor and having operating levers thereon, a clip secured to said motor, a mast having a bent over portion rotatively supported by said clip, a brace rod having its end fixed relative to said body and one end connected to the top of said mast, a pair of cranks pivoted on said mast near the top thereof, shift rods connected between said cranks and the levers on said transmission, a pair of arms supported for rotation at a point fixed relative to said body, cross links pivoted between the said cranks and said pair of arms and means carried on said body for rotating either of said pair of arms.

11. In combination with an automobile having a steering column, a transmission arranged to be shifted by movement of levers, a bracket secured to said steering column, an externally threaded cylindrical member supported in said bracket and having an end wall defining a notched aperture concentrically located with respect to the axis thereof, a shift column extending through the aperture in the wall of said tubular member, a key passed through said shift column and projecting therefrom, said key being arranged to pass through said aperture only when aligned with the notches thereof, screw means for securing said key in position, and means secured to said shift column by said screw means for limiting in one direction the axial movement of said shift column, a pair of arms rotatively supported on said tubular member, a shift arm secured to said shift column and engageable with either arm of said pair of arms, rubber grommets positioned to receive said shift arm in said pair of arms, and linkage connecting said shift arms to the levers of said transmission.

12. In combination with an automobile having a frame and a motor mounted to pivot about its longitudinal axis relative to said frame, a transmission secured to said motor, gear shifting mechanism supported by said frame, a mast secured to said motor and arranged to pivot relative to said motor about an axis parallel to the longitudinal axis of the motor, rotatable members pivotally supported on said mast, and linkage connecting said rotatable members to said gear shifting mechanism and said transmission.

13. In combination with an automobile having a frame with a motor flexibly mounted thereon, a steering column supported on said frame, a transmission supported on said motor, gear shifting mechanism supported on said steering column, a U-shaped clip secured to said motor and extending longitudinally thereof, a mast having a base portion journaled in the legs in said U-shaped clip, a brace rod connecting the top of said mast to said steering column, a crank rotatably supported on the upper end of said mast, and linkage connecting said gear shift mechanism and said transmission to said crank.

14. Remote gear shifting mechanism comprising an externally threaded tubular member having an end wall defining a notched aperture, a fixed bracket defining an internally threaded aperture for supporting said tubular member, a flexible bearing supported within said tubular member, a pair of arms rotatably supported in the ends of said tubular member, a shift column supported in said flexible bearing and extending through said notched aperture, a key projecting from said shift column adjacent the end wall of said tubular member and arranged to pass through said notched aperture in one position only of said shift column, a shift arm secured to said shift column and engageable with either of said pair of arms by axial movement of said shift column, said pair of arms being spaced so that said shift arm and shift column must be moved axially a distance at least equal to the thickness of the notched end wall of said tubular member plus the length of said key measured axially of said shift column to engage one or the other of said pair of arms, and means for moving said shift column and shift arm axially and rotatively.

15. Remote gear shifting mechanism comprising an externally threaded hollow member having an end wall defining a notched aperture, a bracket for rigidly supporting said member, a pair of arms rotatably supported on the threaded portion of said member, a shift column journaled in said member and extending through said notched aperture, means projecting from said shift column adjacent to said end wall and arranged to pass through said notched aperture in one rotative position only of said shift column, a shift arm secured to said shift column and engageable with either of said pair of arms by axial movement of said shift column, said pair of arms being spaced so that said shift arm and shift column must move axially a distance at least equal to the thickness of said notched end wall plus the length of said projecting means measured axially of said shift column to engage one or the other of said pair of arms, and means for moving said shift column axially and rotatively.

16. Remote gear shifting mechanism comprising an externally threaded hollow member having one end wall defining a notched aperture, a bracket having a threaded connection with said member for rigidly supporting said member, a deformable bushing positioned within said hollow member, a pair of arms rotatably threaded on the outside of said member, a shift column journaled in said deformable bushing and extending through said notched aperture, means projecting from said shift column adjacent to said end wall and arranged to pass through said notched aperture in one rotative position only of said shift column, means carried by said shift column engageable with either of said arms by axial movement of said shift column, said last mentioned means and said arms being so arranged that said shift column must be moved axially a distance at least equal to the thickness of said notched end wall plus the length of said last mentioned means measured axially of said shift column to engage one or the other of said arms, and means for moving said shift column and shift arm axially and rotatively.

17. Remote gear shifting mechanism comprising a first member having a threaded surface and a wall defining a notched aperture, supporting means for maintaining said first member against axial movement, a shift column supported by said member for axial and rotative movement relative thereto and extending through said notched aperture, means projecting from said shift column adjacent said wall and arranged to pass through said notched aperture when rotated into alignment therewith, a connecting member secured to said shift column and engageable with either of said arms upon axial movement of said shift column, said arms and connecting means being so arranged that said shift column must be moved axially a sufficient distance to pass said projecting means through said notched aperture before one of said arms will be engaged after engaging the other of said arms, and means for moving said shift column axially and rotatively.

18. In a motor vehicle, a body, and a power unit mounted to move with respect to the body, a transmission control mechanism jointly supported on said body and movable power unit by a linkage system arranged to compensate for power unit movements, said system comprising a mast upstanding from said power unit and pivoted to said power unit, a lever pivotally supported upon said mast for rotation about the axis of said mast, means connecting said lever to said power unit, means to rotate said lever about said mast axis, and a link universally connected to the top of said mast and to said body to constrain the top of said mast to assume a position relatively fixed with respect to said body while the lower portion of said mast is relatively fixed with respect to said power unit in all positions of movement of said power unit.

NILS ERIK WAHLBERG.